United States Patent
Hungerland

(10) Patent No.: US 11,781,011 B2
(45) Date of Patent: Oct. 10, 2023

(54) FILLED POLYCARBONATE COMPOSITION HAVING LOW THERMAL EXPANSION

(71) Applicant: COVESTRO INTELLECTUAL PROPERTY GMBH & CO. KG, Leverkusen (DE)

(72) Inventor: Tim Hungerland, Cologne (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 233 days.

(21) Appl. No.: 17/599,078

(22) PCT Filed: Mar. 20, 2020

(86) PCT No.: PCT/EP2020/057719
§ 371 (c)(1),
(2) Date: Sep. 28, 2021

(87) PCT Pub. No.: WO2020/193386
PCT Pub. Date: Oct. 1, 2020

(65) Prior Publication Data
US 2022/0177698 A1    Jun. 9, 2022

(30) Foreign Application Priority Data
Mar. 28, 2019   (EP) .................................... 19165784

(51) Int. Cl.
| | | |
|---|---|---|
| C08L 69/00 | (2006.01) | |
| F21S 41/37 | (2018.01) | |
| B29C 45/00 | (2006.01) | |
| G02B 5/08 | (2006.01) | |
| B29K 69/00 | (2006.01) | |
| B29K 509/02 | (2006.01) | |

(52) U.S. Cl.
CPC .......... C08L 69/00 (2013.01); B29C 45/0005 (2013.01); B29C 45/0013 (2013.01); F21S 41/37 (2018.01); G02B 5/0808 (2013.01); B29K 2069/00 (2013.01); B29K 2509/02 (2013.01); C08L 2201/08 (2013.01); C08L 2205/025 (2013.01); C08L 2205/03 (2013.01)

(58) Field of Classification Search
CPC ........ C08L 69/00; F21S 41/37; G02B 5/0808; B29C 45/0005; B29C 45/0013
USPC ........................................................ 362/509
See application file for complete search history.

(56) References Cited

U.S. PATENT DOCUMENTS

| | | | |
|---|---|---|---|
| 2006/0287422 A1 | 12/2006 | Volkers et al. | |
| 2012/0022204 A1* | 1/2012 | Wehrmann | C08L 69/00 524/508 |
| 2012/0157586 A1* | 6/2012 | Dern | C08K 5/0041 524/88 |
| 2020/0332114 A1* | 10/2020 | Hungerland | C08L 69/00 |
| 2021/0371648 A1* | 12/2021 | Hungerland | C08L 33/24 |

FOREIGN PATENT DOCUMENTS

| | | |
|---|---|---|
| WO | 2010/108626 A1 | 9/2010 |
| WO | 2019/016369 A1 | 1/2019 |

OTHER PUBLICATIONS

International Search Report and Written Opinion received for PCT Patent Application No. PCT/EP2020/057719, dated Apr. 29, 2020, 19 pages (8 pages of English Translation and 11 pages of Original Document).
Brydson John, "Plastics Materials", 7th Edition, Butterworth-Heinemann, 1999, pp. 1-920.

* cited by examiner

*Primary Examiner* — Christopher M Raabe
(74) *Attorney, Agent, or Firm* — THE WEBB LAW FIRM

(57) ABSTRACT

The present invention relates to a thermoplastic composition, comprising: A) aromatic polycarbonate and B) Ba) reinforcing fibers and/or Bb) spherical particles of oxides of metals or metalloids of the 3rd main group, 4th main group and/or 4th transition group. The composition further comprises: C) PMMI copolymer and D) phosphite stabilizer and/or phosphine stabilizer, wherein, furthermore, the proportion of B) is ≥35% by weight to ≤40% by weight and the proportion of C) is >0.1% by weight in each case based on the total weight of the composition.
The invention further relates to a layered arrangement comprising a substrate layer and a reflection layer distinct from the substrate layer and at least partially covering the substrate layer, wherein the reflection layer at least partially reflects light in the wavelength range from 380 nm to 750 nm, an illumination apparatus comprising a light source and a reflector, wherein the reflector is arranged such that at least a portion of the light transmitted by the light source is reflected by the reflector, and to a process for producing a molded article.

15 Claims, No Drawings

FILLED POLYCARBONATE COMPOSITION HAVING LOW THERMAL EXPANSION

CROSS-REFERENCE TO RELATED APPLICATIONS

This application is a national stage application (under 35 U.S.C. § 371) of PCT/EP2020/057719, filed Mar. 20, 2020, which claims benefit of European Application No. 19165784.0, filed Mar. 28, 2019, both of which are incorporated herein by reference in their entirety.

The present invention relates to a thermoplastic composition, comprising: A) aromatic polycarbonate and B) Ba) reinforcing fibers and/or Bb) spherical particles of oxides of metals or metalloids of the 3rd main group, 4th main group and/or 4th transition group. It further relates to a layered arrangement comprising a substrate layer and a reflection layer distinct from the substrate layer and at least partially covering the substrate layer, wherein the reflection layer at least partially reflects light in the wavelength range from 380 nm to 750 nm, an illumination apparatus comprising a light source and a reflector, wherein the reflector is arranged such that at least a portion of the light emitted by the light source is reflected by the reflector, and to a process for producing a molded article.

(Co)polycarbonate compositions are of interest for the production of carriers for optical elements such as for example reflection surfaces or lenses since they are processable by injection molding. In such applications the dimensional stability of the components is of particular importance in order not to negate carefully developed optical properties of the system due to thermal expansion during operation.

The carrier material should have a low but also ideally isotropic thermal expansion (coefficient of linear thermal expansion, CLTE). This may be achieved using spherical fillers.

A further class of fillers in highly filled polycarbonate systems are reinforcing fibers. These may be used to impart the material with further advantageous mechanical properties. Thermal behavior is desirably such that reduced deformation in one or two dimensions takes place. Applications for such reinforced polycarbonate systems are inter alia lightweight housings for electronic components.

The carrier material should moreover exhibit good processing stability in order that its advantageous properties are not reduced by an injection molding process.

WO 2013/079555 A1 discloses thermoplastic molded articles having a high surface quality as well as thermoplastic molding materials and a process for producing the molded articles. The thermoplastic compositions contain: A) 30.0 to 100.0 parts by weight of at least one aromatic polycarbonate; B) 0.0 parts by weight to 50.0 parts by weight of rubber-modified graft polymer and/or vinyl copolymer; C) 0.00 to 50.00 parts by weight of polyester; D) 5.0 to 50.0 parts by weight of at least one inorganic filler having a particle shape selected from the group comprising spherical/cubic, tubular/discus-shaped and slab-shaped geometries and E) 0.00 to 5.00 parts by weight of further customary additives, wherein the parts by weight of the components A) bis E) sum to 100 parts by weight.

The international patent application having filing number PCT/EP2018/084599 and the priority date of 20 Dec. 2017, now published as WO 2019/121253 A1, relates to the use of at least one PMMI copolymer for reducing the molecular weight degradation of aromatic polycarbonate in talc-containing polycarbonate compositions during compounding. One claimed composition consists of: A) at least 68% by weight of aromatic polycarbonate; B) 10% to 30% by weight of talc; C) 0.2% to 6% by weight of PMMI copolymer and D) optionally one or more further additives selected from the group consisting of flame retardants, anti-drip agents, impact modifiers, fillers distinct from component B, antistats, colorants, pigments, carbon black, lubricants and/or demolding agents, heat stabilizers, blend partners, compatibilizers, UV absorbers and/or IR absorbers. However, the use of phosphite stabilizers is not described here.

The international patent application having filing number PCT/EP2018/084543 and the priority date of 20 Dec. 2017, now published as WO 2019/121229 A1, relates to the use of at least one PMMI copolymer for reducing the molecular weight degradation of aromatic polycarbonate in polycarbonate compositions containing one or more oxides of metals or metalloids of the 3rd main group, 4th main group and/or 4th transition group during compounding. One claimed composition consists of: A) at least 60% by weight of aromatic polycarbonate B) 10% to 30% by weight of one or more oxides of metals or metalloids of the 3rd or 4th main group or 4th transition group; C) 0.2% to 6% by weight of PMMI copolymer and D) optionally one or more further additives distinct from components B and C selected from the group consisting of flame retardants, anti-drip agents, impact modifiers, fillers, antistats, colourants, pigments, carbon black, lubricants and/or demolding agents, heat stabilizers, blend partners, compatibilizers, UV absorbers and/or IR absorbers. The use of phosphite stabilizers is not described here either.

It is an object of the present invention to provide thermoplastic molding materials having a high content of spherical fillers or reinforcing fibers (depending on the desired thermal expansion behavior) which even after two-fold subjection to thermal stress—compounding and injection molding—exhibit the lowest possible molecular weight degradation. This applies especially to injection molding melt temperatures which are exceptionally high for polycarbonate, in particular at 280° C. to 300° C., preferably 290° C. to 300° C., optionally even 330° C. to 350° C., and facilitate the processing of the highly filled molding materials. It is a further object of the present invention to provide downstream products based on these molding materials and corresponding production processes.

The object is achieved according to the invention by a thermoplastic composition comprising:
A) aromatic polycarbonate and
B) Ba) reinforcing fibers
and/or
Bb) spherical particles of oxides of metals or metalloids of the 3rd main group, 4th main group and/or 4th transition group,
characterized in that
the composition further comprises:
C) PMMI copolymer and
D) phosphite stabilizer and/or phosphine stabilizer,
wherein, furthermore, the proportion of B) is ≥35% by weight to ≤60% by weight and the proportion of C) is >0.1% by weight in each case based on the total weight of the composition.

This may be a constituent of a layered arrangement, wherein the layered arrangement comprises a substrate layer comprising such a composition and a reflection layer distinct from the substrate layer which at least partially covers the substrate layer, wherein the reflection layer at least partially reflects light in the wavelength range of 380 nm to 750 nm. Such a layered arrangement may be a constituent of an illumination apparatus comprising a light source and a reflector, wherein the reflector is arranged such that at least a portion of the light emitted by the light source is reflected by the reflector, wherein the reflector contains the above-described layered arrangement. A production process as claimed in claim 15 employs the composition according to the invention. Such a production process is used for producing a molded article wherein a thermoplastic composition is molded into the molded article under the influence of heat. Advantageous developments are contained in the dependent claims. They may be combined as desired unless the opposite is clear from the context.

It has surprisingly been found that in polycarbonate compositions having a high content of spherical fillers and/or reinforcing fibers processing stability can be increased even during an injection molding step following the compounding when a combination of PMMI copolymer in a certain minimum content and a phosphorus-containing stabilizer selected from the group of phosphite stabilizer and/or phosphine stabilizer is present.

A criterion for good processing stability of polycarbonate homopolymers may be in particular when the number-average molecular weight Mw of the polycarbonate is less than 5% lower relative to the starting state before compounding (to produce the filler-containing molding materials) but before injection molding and simultaneously less than 7% lower relative to the starting state after injection molding.

In the case of polycarbonate copolymers such as for example copolycarbonates based on the monomers bisphenol A and 1,1-bis(4-hydroxyphenyl)-3,3,5-trimethylcyclohexane the second criterion becomes "is less than 10% lower relative to the starting state before injection molding".

Component A

Component A) is at least one aromatic polycarbonate. It is thus also possible to use mixtures as component A). For the purposes of the present invention, polycarbonates are either homopolycarbonates or copolycarbonates; the polycarbonates can, as is known, be linear or branched. The polycarbonates are produced in a known manner from dihydroxyaryl compounds, carbonic acid derivatives, and optionally chain terminators and branching agents.

Preferred dihydroxyaryl compounds are selected from at least one from the group of 4,4'-dihydroxybiphenyl, 2,2-bis (4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl) propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Examples of suitable carbonic acid derivatives are phosgene or diphenyl carbonate. Suitable chain terminators that may be used in the production of the polycarbonates used in accordance with the invention are monophenols. Suitable monophenols are for example phenol itself, alkylphenols such as cresols, p-tert-butylphenol, cumylphenol and mixtures thereof. Suitable branching agents are the trifunctional or more than trifunctional compounds known in polycarbonate chemistry, in particular those having three or more than three phenolic OH groups.

The polycarbonate A) is preferably the homopolycarbonate based on bisphenol A, the homopolycarbonate based on 1,1-bis(4-hydroxyphenyl)-3,3,5-trimethylcyclohexane, a copolycarbonate based on the monomers bisphenol A and 1,1-bis(4-hydroxyphenyl)-3,3,5-trimethylcyclohexane or a mixture of at least two of the abovementioned polymers.

Component B

According to the invention the compositions contain as component Ba reinforcing fibers and/or as component Bb at least one oxide of a metal or metalloid of the 3rd or 4th main group or 4th transition group. Suitable reinforcing fibers are for example glass fibers or carbon fibers or mixtures thereof. The fibers preferably have a cut length of ≥2 mm to ≤5 mm and/or a cross sectional ratio of ≥1:1 to ≤2:1.

The oxides of a metal or metalloid of the 3rd or 4th main group or 4th transition group may be employed alone or in a mixture. Preferably employed are titanium dioxide, silicon dioxide and/or aluminum oxide, particularly preferably titanium dioxide and/or silicon dioxide, very particularly preferably titanium dioxide, in particular without further oxides of a metal or metalloid of the 3rd or 4th main group or 4th transition group, with the exception of titanium dioxide and/or silicon dioxide coatings. Component Bb is therefore preferably selected from this aforementioned limited group.

Component B is the sum of the proportions of components Ba and Bb. Component B may contain Ba alone, Bb alone or a mixture of Ba and Bb. Component B is preferably present in the compositions according to the invention in an amount of ≥36% to ≤55% by weight, more preferably of ≥37% to ≤50% by weight, yet more preferably of ≥38% to ≤45% by weight, particularly preferably of ≥39% to ≤40% by weight, in each case based on the total composition.

The silicon dioxide is preferably naturally occurring or synthetically produced quartz or fused silica.

The particles used in the compositions according to the invention have a spherical particle shape. In the present invention the term "spherical" is to be understood as encompassing not only an ideal sphere shape but also particles described by axes of equal length starting from a common origin and oriented into the space, wherein the axes define the radius of the particles in all spatial directions, each independently of one another being able to have a deviation of the axis lengths from the ideal state of a sphere of up to 20% (preferably up to 10%).

The quartzes are preferably characterized by a median diameter $d_{50}$ determined according to ISO 13320:2009 of 2 to 10 μm, more preferably of 2.5 to 8.0 μm, and yet more preferably of 3 to 5 μm, wherein a maximum diameter $d_{95}$, determined according to ISO 13320:2009, of correspondingly 6 to 34 μm, more preferably of 6.5 to 25.0 μm, yet more preferably of 7 to 15 μm and particularly preferably of 10 μm is preferred.

The quartzes preferably have a specific BET surface area determined by nitrogen adsorption according to ISO 9277: 2010 of 0.4 to 8.0 m$^2$/g, more preferably of 2 to 6 m$^2$/g and particularly preferably of 4.4 to 5.0 m$^2$/g.

More preferred quartzes comprise only not more than 3% by weight of secondary constituents, wherein it is preferable when the content of $Al_2O_3$ is <2.0% by weight, $Fe_2O_3$ is <0.05% by weight, (CaO+MgO) is <0.1% by weight and ($Na_2O+K_2O$) is <0.1% by weight, in each case based on the total weight of the quartz or silicate.

It is preferable to employ quartzes having a pH measured according to ISO 10390:2005 in aqueous suspension in the range 6 to 9, more preferably 6.5 to 8.0.

Said quartzes preferably have an oil absorption number according to DIN EN ISO 787-5:1995-10 of preferably 20 to 30 g/100 g.

In a preferred embodiment component Bb is selected from finely divided quartz flours produced by iron-free milling with subsequent air sifting from worked-up quartz sand.

It is particularly preferable to employ fused silica, i.e. fused quartz, as component Bb, which is molten and resolidified silicon dioxide.

Quartzes or fused quartzes having a size on their surface may be employed, preference being given to employing epoxy-modified, polyurethane-modified and unmodified silane compounds, methylsiloxane and methacryloylsilane sizes or mixtures of the abovementioned silane compounds. Particular preference is given to an epoxysilane size. The sizing of silicon dioxide is effected by the general methods known to those skilled in the art.

However, it is preferable when the silicon dioxide employed for the compositions according to the invention is unsized.

Suitable titanium dioxides are preferably those produced by the chloride process, hydrophobized, specially aftertreated and suitable for use in polycarbonate, for example the commercially available product Kronos 2230 (Kronos Titan).

Possible surface modifications of titanium dioxide include inorganic and organic modifications. These include for example aluminum- or polysiloxane-based surface modifications. An inorganic coating may contain 0% to 5% by weight of silicon dioxide and/or aluminum oxide. An organic-based modification may contain 0% to 3% by weight of a hydrophobic wetting agent.

The titanium dioxide preferably has an oil absorption number determined according to DIN EN ISO 787-5:1995-10, of 12 to 18 g/100 g of titanium dioxide, more preferably of 13 to 17 g/100 g of titanium dioxide, particularly preferably of 13.5 to 15.5 g/100 g of titanium dioxide.

Particular preference is given to titanium dioxide having the standard designation R2 according to DIN EN ISO 591-1:2001-8, part 1, which is stabilized with aluminum and/or silicon compounds and has a titanium dioxide content of at least 96.0% by weight. Such titanium dioxides are available under the brand names Kronos® 2233 and Kronos® 2230.

When aluminum oxide is employed as component Bb this preferably has a pH of 7.0 to 7.4 measured according to ISO 10390:2005 in aqueous suspension. It is preferably unsized.

The specified amounts for component Bb in each case relate to the total weight of the employed oxide, including any size/surface modification.

Preferably employed as component B) are Bb) spherical quartz having an average diameter $d_{50}$ of ≥3 µm to ≤5 µm and an average diameter $d_{98}$, in each case determined according to ISO 13320:2009, of ≥10 µm to ≤15 µm and/or Ba) glass fibers having a cut length of ≥2 mm to ≤5 mm and a cross sectional ratio of ≥1:1 to ≤2:1.

Component C

Component C is selected from PMMI copolymers. These are thermoplastics that are partly imidated methacrylic polymers. PMMI copolymers are in particular obtained by reaction of PMMA with methylamine in a dispersion or in a melt in a reactor. A suitable process is described, for example, in DE 1077 872 A1. Imide structures are produced along the polymer chain, with formation, depending on the degree of reaction, also of methacrylic anhydride and free methacrylic acid functionalities. The proportion of imide functionalities in the copolymer determines the heat resistance thereof. The degree of reaction is specifically adjustable.

PMMI copolymers have methyl methacrylate (MMA), methylmethacrylimide (MMI), methylmethacrylic acid (MMS) and methylmethacrylic anhydride units (MMAH). Preferably at least 90% by weight, more preferably at least 95% by weight, of the PMMI copolymer, based on the total weight of the PMMI copolymer, is selected from MMA, MMI, MMS and MMAH units. It is particularly preferable when the PMMI copolymers consist of these units.

The units and their proportions in the PMMI copolymer can in particular be determined by means of quantitative $^1$H NMR spectroscopy on the basis of unambiguous chemical shift of the R' signals. The signals of the acid and anhydride monomer units cannot be assigned unambiguously and a collective consideration of these units is therefore advisable.

The PMMI copolymer preferably has an MMI proportion of at least 30% by weight, preferably of at least 35% by weight, more preferably of 35% to 96% by weight, particularly preferably of 36% to 95% by weight, of MMI, based on the total weight of the PMMI copolymer.

The MMA content of the copolymer is preferably 3% to 65% by weight, preferably 4% to 60% by weight, especially preferably 4.0% to 55% by weight, based on the total weight of the PMMI copolymer.

The proportion of MMS and MMAH is in total preferably up to 15% by weight, more preferably up to 12% by weight, particularly preferably 0.5% to 12% by weight, based on the total weight of the PMMI copolymer.

The acid number of the PMMI copolymers, determined according to DIN 53240-1:2013-06, is preferably 15 to 50 mg KOH/g, more preferably 20 to 45 mg KOH/g, even more preferably 22 to 42 mg KOH/g.

A very particularly preferred PMMI copolymer has an MMI proportion of 36.8% by weight, an MMA proportion of 51.7% by weight and an MMS+MMAH proportion of 11.5% by weight in each case based on the total weight of the PMMI copolymer and determined by $^1$H NMR spectroscopy and an acid number of 22.5 mg KOH/g determined according to DIN 53240-1:2013-06.

An alternatively very particularly preferred PMMI copolymer has an MMI proportion of 83.1% by weight, an MMA proportion of 13.6% by weight and an MMS+MMAH proportion of 3.3% by weight in each case based on the total weight of the PMMI copolymer and determined by $^1$H NMR spectroscopy and an acid number of 22.5 mg KOH/g determined according to DIN 53240-1:2013-06.

A likewise alternatively very particularly preferred PMMI copolymer has an MMI proportion of 94.8% by weight, an MMA proportion of 4.6% by weight and an MMS+MMAH proportion of 0.6% by weight in each case based on the total weight of the PMMI copolymer and determined by $^1$H NMR spectroscopy and an acid number of 41.5 mg KOH/g determined according to DIN 53240-1:2013-06.

Suitable PMMI is available, for example, from Evonik Industries AG under the "PLEXIMID®" brand.

It is provided according to the invention that the proportion of PMMI copolymer C) is >0.1% by weight. The proportion of PMMI copolymer C) is furthermore preferably ≤0.5% by weight based on the total weight of the composition. The proportion of C) is preferably ≥0.2% by weight to ≤0.5% by weight based on the total weight of the composition.

It is preferable when the glass transition temperature of the PMMI copolymer C) determined according to DIN EN ISO 11357-2:2014-07 at a heating rate of 20° C./min is ≥120° C. to ≤170° C. and preferably ≥130° C. to ≤150° C. The PMMI copolymer is accordingly stable under the processing conditions customary for polycarbonate including high-temperature-stable polycarbonate copolymers.

Component D

The phosphite and/or phosphine stabilizers may be employed alone or as a constituent of mixtures. It is preferable when D) is tris(2,4-di-tert-butylphenyl)phosphite (Irgafos® 168), bis(2,4-dicumylphenyl)pentaerythritol diphosphite (Doverphos® S-9228), bis(2,6-di-tert-butyl-4-methylphenyl)pentaerythritol diphosphite (ADK STAB PEP-36), triphenylphosphine or a mixture containing at least one of the abovementioned compounds.

It is preferable when the proportion of D) is ≥0.01% by weight to ≤0.5% by weight based on the total weight of the composition. The content is preferably ≥0.04% by weight to ≤0.1% by weight.

The composition according to the invention may contain further customary additives as component E such as flame retardants, anti-drip agents, impact modifiers, antistats, colorants, pigments, carbon black, lubricants and/or demolding agents, blend partners, compatibilizers, UV absorbers, IR absorbers and the like.

In a further embodiment the composition contains the spherical particles Bb) and has a coefficient of linear thermal expansion (CLTE) determined according to DIN 53752: 1980-12 and measured in a temperature range of 23-60° C. of ≥20 ppm/K to ≤50 ppm/K. The CLTE values in the longitudinal direction of the test specimen deviate from the CLTE values in the transverse direction of the test specimen by preferably not more than 4 ppm/K and more preferably not more than 3 ppm/K.

In a further embodiment the composition contains the reinforcing fibers Ba) and has a coefficient of linear thermal expansion (CLTE) determined according to DIN 53752: 1980-12 and measured in a temperature range of 23-60° C. in the direction of the test specimen corresponding to the longitudinal direction of the fibers of ≥10 ppm/K to ≤30 ppm/K. It is preferable when the CLTE in the direction of the test specimen corresponding to the transverse direction of the fibers is ≥50 ppm/K to ≤70 ppm/K.

In a further embodiment the composition comprises based on the total weight of the composition: ≥55% by weight to ≤65% by weight, preferably 54.79% by weight to 64.79% by weight, of A), ≥35% by weight to ≤45% by weight of B), ≥0.2% by weight to ≤0.5% by weight of C) and ≥0.01% by weight to ≤0.1% by weight of D), wherein the parts by % by weight sum to ≤100% by weight.

The composition preferably comprises based on the total weight of the composition:

A)≥55% by weight to ≤65% by weight, preferably 54.79% by weight to 64.79% by weight, of a homopolycarbonate based on bisphenol A, a homopolycarbonate based on 1,1-bis(4-hydroxyphenyl)-3,3,5-trimethylcyclohexane, a copolycarbonate based on the monomers bisphenol A and 1,1-bis(4-hydroxyphenyl)-3,3,5-trimethylcyclohexane or a mixture of at least two of the abovementioned polymers.

B) ≥35% by weight to ≤45% by weight of Bb) spherical quartz having an average diameter $d_{50}$ of ≥3 µm to ≤5 µm and an average diameter $d_{98}$, in each case determined according to ISO 13320:2009, of ≥10 µm to 15 µm and/or Ba) glass fibers having a cut length of ≥2 mm to ≤5 mm and a cross sectional ratio of ≥1:1 to ≤2:1, C) 0.2% by weight to ≤0.5% by weight of a PMMI copolymer having a glass transition temperature determined according to DIN EN ISO 11357-2:2014-07 at a heating rate of 20° C./min of ≥120° C. to ≤170° C. and D) ≥0.01% by weight to ≤0.1% by weight of tris(2,4-di-tert-butylphenyl)phosphite, bis(2,4-dicumylphenyl)pentaerythritol diphosphite, bis(2,6-di-tert-butyl-4-methylphenyl)pentaerythritol diphosphite, triphenylphosphine or a mixture containing at least one of the abovementioned compounds, wherein the parts by % by weight sum to ≤100% by weight. It is more preferable when no further components are present in addition to further additives selected from the group of flame retardants, anti-drip agents, impact modifiers, antistats, colorants, pigments, carbon black, lubricants and/or demolding agents, blend partners, compatibilizers, UV absorbers, IR absorbers. It is preferable when the compositions according to the invention consist only of the components A) to D) and optionally demolding agents.

The invention likewise relates to a layered arrangement comprising a substrate layer and a reflection layer distinct from the substrate layer and at least partially covering the substrate layer, wherein the reflection layer at least partially reflects light in the wavelength range from 380 nm to 750 nm, wherein the substrate layer contains a composition according to the invention. This preferably means that a subregion of the substrate layer or else the entire substrate layer is produced from the composition according to the invention. It is preferable when the substrate layer consists of the composition according to the invention. The reflection layer thus reflects visible light, wherein light of other wavelengths (UV, IR) is not excluded. The substrate layer preferably contains or is a composition according to the invention containing the spherical particles Bb). The substrate layer more preferably has a coefficient of linear thermal expansion (CLTE) determined according to DIN 53752:1980-12 of ≥20 ppm/K to ≤50 ppm/K. It is yet more preferable when in the substrate layer the CLTE values in the longitudinal direction of a test specimen for determining CLTE values deviate from the CLTE values in the transverse direction of the test specimen by preferably not more than 4 ppm/K and more preferably not more than 3 ppm/K.

In one embodiment of the layered arrangement the reflection layer is a metal layer. It may be an aluminum layer or a noble metal layer for example. The layer may be applied by chemical processes, in particular chemical vapor deposition (CVD) or galvanizing, or by physical processes, in particular physical vapor deposition (PVD), or sputtering.

In a further embodiment of the layered arrangement the reflection layer has a thickness of ≥10 nm to ≤100 nm, preferably ≥30 nm to ≤80 nm.

The layered arrangement may be planar and thus act as a simple mirror. However, in a further embodiment the layered arrangement is not planar. It may then act as a converging or diverging mirror. The layered arrangement may be in the form of a rotational paraboloid for example.

The invention further provides an illumination apparatus comprising a light source and a reflector, wherein the reflector is arranged such that at least a portion of the light emitted by the light source is reflected by the reflector, wherein the reflector contains a layered arrangement according to the invention. One example for such an illumination apparatus is a headlight such as is employed as a front light in motor vehicles.

The invention further relates to a process for producing a molded article, wherein a thermoplastic composition is molded to afford the molded article under the influence of heat, wherein the thermoplastic composition is a composition according to the invention.

EXAMPLES

The present invention is more particularly elucidated with reference to the following examples without, however, being limited thereto.

Polymers:

A1: is a commercially available polycarbonate based on bisphenol A having an MVR of 19 cm$^3$/10 min (300° C./1.2 kg, ISO 1133-1:2011) and a softening temperature (VST/B 120; ISO 306:2013) of 145° C. (Makrolon® 2408 from Covestro Deutschland AG). The molecular weight $M_w$ was approx. 23 887 g/mol.

A2: is a commercially available copolycarbonate based on bisphenol A and bisphenol TMC having an MVR of 18 cm$^3$/10 min (330° C./2.16 kg, ISO 1133-1:2011) and a softening temperature (VST/B 120; ISO 306:2013) of 183° C. (Apec® 1895 from Covestro Deutschland AG). The molecular weight $M_w$ was approx. 27 855 g/mol.

Fillers:

B1: is a spherical fused quartz from Quarzwerke GmbH (50226 Frechen, Germany) which is available under the trade name Amosil FW600 ($D_{50}$=4 µm, $D_{98}$=13 µm, unsized). This is a fired silicon dioxide having a $D_{10}/D_{90}$ ratio of about 1.5/10 µm and a specific surface area of about 6 m$^2$/g determined according to DIN ISO 9277 (DIN-ISO 9277:2014-01).

B2: is a glass fiber from Nittobo (2-4-1, Kojimachi, Chiyoda-ku, Tokyo 102-8489, Japan) which is available under the trade name CSG 3PA-830. This is a flat glass fiber having a 3 mm cut length and a cross sectional ratio of 1.4.

Stabilizers:

C1: is a commercially available copolymer based on polymethacryloylmethylimide (Pleximid® 8803) having a softening temperature (VST/B 50; ISO 306:2013) of 130° C.

C2: is a commercially available copolymer based on polymethacryloylmethylimide (Pleximid® TT50) having a softening temperature (VST/B 50; ISO 306:2013) of 150° C.

D1: is a phosphite from Adeka which is available under the trade name ADK-Stab-Pep36 (CAS No. 80693-00-1; bis(2,6-di-tert-butyl-4-methylphenyl)pentaerythritol diphosphite).

D2: Triphenylphosphine (CAS No. 603-35-0) from BASF.

D3: is a stabilizer mixture (80% Irgafos168; s. D4)+20% Irganox1076; phenolic antioxidant; CAS No. 2082-79-3) from BASF (Ludwigshafen) which is commercially available under the trade name Irganox B900.

D4: is a phosphite from BASF available under the trade name Irgafos 168 (CAS No. 31570-04-4).

D5: is a phosphite from Dover Chemical Corporation available under the trade name Doverphos S9228 (CAS No. 154862-43-8).

Demolding Agent:

E1: PETS (pentaerythritol tetrastearate)

Production Conditions:

Method A: BUSS kneader, melt temperature: 280-300° C., speed: 350 rpm, throughput: 75 kg/h, torque: 30%, filler addition via side extruder.

Method B: ZE 25 AX 40D-UTX twin-screw extruder from Berstorff, extruder melt temperature: 300° C. (320° C. for polymer A2), extruder speed: 225 rpm, throughput: 20 kg/h, torque: 50-60%, filler addition via side extruder on housing 5 (of 9).

Procedure:

Production of the polycarbonate compositions was carried out using either a BUSS kneader (method A) or a twin screw extruder (method B). Depending on the apparatus the processing temperatures were between 280-300° C. at a speed of 225 min$^{-1}$ or 350 min$^{-1}$. The employed filler was supplied via a side extruder and the polycarbonate and the powder premixture containing all further additives were added via the main feed.

After sufficient drying of the granulates the test specimens were produced by injection molding at a processing temperature of the melt of 290-330° C. and in the case of Apec®-containing molding materials of 310-350° C.

The CLTE values were determined by thermomechanical analysis (TMA) according to DIN 53752:1980-12 in the range between room temperature and 60° C. on test specimens having dimensions of 10 mm×10 mm×4 mm.

Molecular weights Mw were determined as follows: Gel permeation chromatography, calibrated against bisphenol A polycarbonate standards, using dichloromethane as eluent. Calibration with linear polycarbonates (formed from bisphenol A and phosgene) of known molar mass distribution from PSS Polymer Standards Service GmbH, Germany, calibration by method 2301-0257502-09D (2009, German language) from Currenta GmbH & Co. OHG, Leverkusen. The eluent is dichloromethane. Column combination of cross-linked styrene-divinylbenzene resins. Diameter of analytical columns: 7.5 mm; length: 300 mm. Particle sizes of column material: 3 µm to 20 µm. Concentration of solutions: 0.2% by weight. Flow rate: 1.0 ml/min, temperature of solutions: 30° C. Injection volume: 100 µl. Detection by means of UW detector.

The reported compositions are numbered consecutively. A "V" denotes a comparative example and an "E" denotes an inventive example.

Compounding According to Method A and Subsequent Injection Molding Experiments with Phosphite/PMMI:

TABLE 1

Changes in the molecular weight of polycarbonate measured after compounding and after injection molding at different melt temperatures.

| No. | V-1 | V-2 | V-3 | V-4 | E-5 | E-6 | V-7 | V-8 |
|-----|-----|-----|-----|-----|-----|-----|-----|-----|
| A1  | 59.5 | 59.425 | 59.325 | 59.35 | 59.35 | 59.35 | 59.475 | 59.325 |
| B1  | 40 | 40 | 40 | 40 | 40 | 40 | 40 | 40 |
| E1  | 0.4 | 0.4 | 0.4 | 0.4 | 0.4 | 0.4 | 0.4 | 0.4 |
| C1  |     |     |     |     | 0.1 | 0.2 |     |     |
| D1  | 0.075 | 0.15 | 0.25 | 0.25 | 0.15 | 0.05 |     |     |

TABLE 1-continued

Changes in the molecular weight of polycarbonate measured after compounding and after injection molding at different melt temperatures.

| No. | V-1 | V-2 | V-3 | V-4 | E-5 | E-6 | V-7 | V-8 |
|---|---|---|---|---|---|---|---|---|
| D2 | 0.025 | 0.025 | 0.025 | | | | 0.025 | 0.025 |
| D3 | | | | | | | 0.1 | 0.25 |
| Longitudinal/ transverse CLTE (ppm/K) | | | | | 46/48 | | | |
| Mw (g/mol) | | | | | | | | |
| Comp.: | 21 820 | 22 390 | 22 550 | 22 620 | 23 140 | 23 070 | 20 890 | 20 930 |
| $\Delta M_w$ comp. (%)[3] | 8.65 | 6.27 | 5.60 | 5.30 | 3.13 | 3.42 | 12.55 | 12.38 |
| Injection molding: | | | | | | | | |
| 290° C. | | | 19 820 | | | 23 080 | | |
| 300° C. | | | 19 390 | | | 22 340 | | |
| 310° C. | | | 18 910 | | | 22 080 | | |
| 320° C. | | | 19 380 | | | 21 550 | | |
| 330° C. | | | 18 380 | | | 20 930 | 18 500[2] | 18 410[2] |
| $\Delta M_w$ SG (%)[1] | | | 23.05 | | | 12.38 | 22.55 | 22.93 |

[1]Difference between molecular weight of polycarbonate before compounding and of the respective composition after processing by injection molding at 330° C.
[2]Measured on polymer strands after rheology measurement at 330° C.
[3]Difference between molecular weight of polycarbonate before and after compounding.

From table 1 it is initially apparent that the molecular weight of polycarbonate is less severely reduced in the compounding process with increasing content of D1 (compositions 1-3). However, above 0.15% of component D1 there is no longer a big difference. Omitting D2 as a processing stabilizer has no effect on molecular weight (cf. V-3/V-4). The addition of C1 reduces molecular weight degradation during compounding (cf. E-5 with V-2). Increasing the C-1 content further reduces the phosphite amount (cf. E-6 with V-1). The use of another customary process stabilizer (D3) shows much more severe molecular weight degradation (cf. V-7 with V-1 and V-8 with V-3).

In terms of processing stability in the downstream process (injection molding) the differences are even clearer. Thus, composition E-6 which contains both phosphite and PMMI is markedly more stable to molecular weight degradation than composition V-3 which contains only the phosphite. Stability is demonstrated over a temperature range which is very wide and relevant for this material (high filler contents require a greater melt temperature to ensure flowability).

The results thus show a synergistic effect of phosphite and PMMI.

Compounding According to Method B and Subsequent Injection Molding Experiments with Phosphite/PMMI:

TABLE 2

Changes in the molecular weight of polycarbonate measured after compounding and after injection molding at different melt temperatures.

| No. | Mol % phosphorus ($\cdot 10^{-4}$) | E-9 | E-10 | E-11 | E-12 | V-13 | V-14 | V-15 |
|---|---|---|---|---|---|---|---|---|
| A1 | | 59.35 | 59.35 | 59.35 | 59.05 | 59.05 | 59.4 | 59.35 |
| B1 | | 40 | 40 | 40 | 40 | 40 | 40 | 40 |
| E1 | | 0.4 | 0.4 | 0.4 | 0.4 | 0.4 | 0.4 | 0.4 |
| C1 | | 0.2 | 0.2 | 0.2 | 0.2 | 0 | 0.2 | 0 |
| D1 | 1.6 | 0.05 | | | | 0.05 | 0 | 0.25 |
| D2 | 1.9 | | | | 0.05 | | | |
| D4 | 0.77 | | 0.05 | | | | | |
| D5 | 1.2 | | | 0.05 | | | | |
| Mw (g/mol) | | | | | | | | |
| Comp.: | | 23 400 | 23 500 | 23 500 | 23 400 | 23 070 | 23 180 | 23 080 |
| $\Delta M_w$ comp. (%)[2] | | 2.04 | 1.62 | 1.62 | 2.04 | 3.42 | 2.96 | 3.38 |
| Injection molding: | | | | | | | | |
| 290° C. | | 23 560 | 23 110 | 23 190 | 22 800 | 21 950 | 22 910 | 22 060 |
| 310° C. | | 23 000 | 22 670 | 22 890 | 22 430 | 21 480 | 22 420 | 21 580 |

TABLE 2-continued

Changes in the molecular weight of polycarbonate measured after compounding and after injection molding at different melt temperatures.

| No. | Mol % phosphorus ($\cdot 10^{-4}$) | E-9 | E-10 | E-11 | E-12 | V-13 | V-14 | V-15 |
|---|---|---|---|---|---|---|---|---|
| 330° C. | | 22 490 | 22 290 | 22 440 | 22 300 | 21 200 | 22 080 | 20 860 |
| $\Delta M_w$ SG (%)[1] | | 5.85 | 6.69 | 6.06 | 6.64 | 11.25 | 7.56 | 12.67 |

[1]Difference between molecular weight of polycarbonate before compounding and of the respective composition after processing at 330° C.
[2]Difference between molecular weight of polycarbonate before and after compounding.

It is apparent from the data in table 2 that there is a synergistic effect of phosphite/phosphine and PMMI in respect of process stabilization. This applies to a series of different P-based heat stabilizers (D4 shows the highest effectiveness measured by the molecular amount of active P species). The differences at a content of 0.2% by weight of C1 are low but it is especially shown that the absence of PMMI results in a marked deterioration of $\Delta$Mw from 5.9% to 11.3% (cf. for example V-13 with E-9). Comparing the molecular weights after extrusion makes it clear that the compositions containing both phosphite and PMMI are less severely damaged than the compositions V-13 and V-14. Despite a similar percentage decrease of the Mw for V-14 the final value at the respective processing temperature is thus lower than for the inventive compositions. Increasing the phosphite content (V-15) moreover interestingly results in a marked deterioration relative to V-13.

Investigation into Effect of PMMI Concentration:

TABLE 3

Changes in the molecular weight of polycarbonate measured after compounding and after injection molding at different melt temperatures. Examples V-13 and E-9 are reported again for comparative purposes.

| Composition | V-13 | V-16 | E-9 | E-17 | E-18 |
|---|---|---|---|---|---|
| A1 | 59.55 | 59.45 | 59.35 | 59.05 | 59.35 |
| B1 | 40 | 40 | 40 | 40 | 40 |
| E1 | 0.4 | 0.4 | 0.4 | 0.4 | 0.4 |
| C1 | | 0.1 | 0.2 | 0.5 | |
| C2 | | | | | 0.2 |
| D1 | 0.05 | 0.05 | 0.05 | 0.05 | 0.05 |
| Mw (g/mol) | | | | | |
| Comp.: | 23 070 | 23 260 | 23 400 | 23 560 | 23 370 |
| $\Delta M_w$ comp. (%)[2] | 3.42 | 2.62 | 2.04 | 1.37 | 2.16 |
| Injection molding: | | | | | |
| 290° C. | 21 950 | 23 040 | 23 560 | 23 760 | 23 190 |
| 310° C. | 21 480 | 22 520 | 23 000 | 23 510 | 22 980 |
| 330° C. | 21 200 | 21 870 | 22 490 | 23 400 | 22 440 |
| $\Delta$Mw (%)[1] | 11.25 | 8.44 | 5.85 | 2.04 | 6.06 |

[1]Difference between molecular weight of polycarbonate before compounding and of the respective composition after processing at 330° C.
[2]Difference between molecular weight of polycarbonate before and after compounding.

It is apparent from the data in table 3 that an increase in the concentration of C1/C2 brings about a marked improvement in respect of processing stability ($\Delta M_w$). At a PMMI content of 0.5% by weight the molecular weight of the polycarbonate compound has fallen by only 1% (the optimal upper limit is 0.5% by weight). This effect is also apparent when using C2 in example E-18.

Effect of Filler Content: +Further Fillers (Glass Fiber, 30-50% $SiO_2$); Production According to Method B:

TABLE 4

Changes in the molecular weight of polycarbonate measured after compounding and after injection molding at different melt temperatures. Example E-9 is reported again for comparative purposes.

| Composition | V-19 | E-20 | E-21 | E-9 | V-22[C] | V-23[C] | V-24 | E-25 |
|---|---|---|---|---|---|---|---|---|
| A1 | 69.35 | 69.35 | 64.35 | 59.55 | 54.19 | 49.19 | 59.35 | 59.35 |
| B1 | 30 | 30 | 35 | 40 | 45 | 50 | | |
| B2 | | | | | | | 40 | 40 |

TABLE 4-continued

Changes in the molecular weight of polycarbonate measured after compounding and after injection molding at different melt temperatures. Example E-9 is reported again for comparative purposes.

| Composition | V-19 | E-20 | E-21 | E-9 | V-22[C] | V-23[C] | V-24 | E-25 |
|---|---|---|---|---|---|---|---|---|
| E1 | 0.4 | 0.4 | 0.4 | 0.4 | 0.4 | 0.4 | 0.4 | 0.4 |
| C1 |  | 0.2 | 0.2 | 0.2 |  |  |  | 0.2 |
| D1 | 0.25 | 0.05 | 0.05 | 0.05 | 0.25 | 0.25 | 0.25 | 0.05 |
| Longitudinal/transverse CLTE (ppm/K) | 51/53 |  |  | 46/48 | 40/43 | 38/40 |  | 19/60 |
| Mw (g/mol) |  |  |  |  |  |  |  |  |
| Comp.: |  |  | 23 690 | 23 400 | 23 120 | 22 670 |  |  |
| $\Delta M_w$ comp. (%)[2] |  |  | 0.82 | 2.04 | 3.21 | 5.09 |  |  |
| Injection molding: |  |  |  |  |  |  |  |  |
| 290° C. | 23 060 | 23 570 | 23 500 | 23 560 |  |  | 21 790 | 23 150 |
| 310° C. | 22 310 | 23 380 | 23 170 | 23 000 |  |  | 21 560 | 22 980 |
| 320° C. |  |  |  |  |  |  | 21 200 | 22 640 |
| 330° C. | 21 800 | 23 150 | 22 930 | 22 490 | 21 260 | 20 270 | 20 760 |  |
| $\Delta Mw$ (%)[1] | 8.74 | 3.08 | 4.01 | 5.85 | 10.99 | 15.14 | 11.25* | 5.22* |

[1]Difference between molecular weight of polycarbonate before compounding and of the respective composition after processing at 330° C.
[2]Difference between molecular weight of polycarbonate before and after compounding.
[C]Includes 0.16% by weight of carbon black.
*Difference measured after injection molding at a melt temperature of 320° C.

Effect in Copolycarbonate:

TABLE 5

Changes in the molecular weight of (co)polycarbonate measured after compounding and after injection molding at different melt temperatures.

| Composition | E-9 | E-29[2] | V-30 | V-31 |
|---|---|---|---|---|
| A1 | 59.55 | 5.00 |  |  |
| A2 |  | 54.35 | 59.55 | 59.55 |
| B1 | 40 | 40 | 40 | 40 |
| E1 | 0.4 | 0.4 | 0.4 | 0.4 |
| C1 | 0.2 | 0.2 |  |  |
| D1 | 0.05 | 0.05 | 0.05 | 0.25 |
| Mw (g/mol) |  |  |  |  |
| Comp.: | 23 400 | 26 400 | 25 730 | 25 750 |
| $\Delta M_w$ comp. (%)[3] | 2.04 | 5.22 | 7.63 | 7.56 |
| Injection molding: |  |  |  |  |
| 290° C. | 23 560 |  |  |  |
| 310° C. | 23 000 | 25 880 | 24 560 | 24 060 |
| 330° C. | 22 490 | 25 510 | 24 110 | 24 120 |
| 350° C. |  | 24 670 | 23 280 | 23 710 |
| $\Delta Mw$ (%)[1a] | 5.85 | 8.88 | 13.44 | 13.41 |
| $\Delta Mw$ (%)[1b] |  | 11.43 | 16.42 | 14.88 |

[1a]Difference between molecular weight of polycarbonate before compounding and of respective composition after processing at 330° C.
[1b]Difference between molecular weight of polycarbonate before compounding and of respective composition after processing at 350° C.
[2]The melt temperature during compounding was 320° C.
[3]Difference between molecular weight of polycarbonate before and after compounding.

The effect is likewise clearly apparent in A2 (Apec®). Increasing the content of stabilizer D1 only shows a slight improvement (cf. V-31 and V-30) in molecular weight degradation at a processing temperature of 350° C. but said degradation is still markedly higher than in E-29.

The invention claimed is:

1. A thermoplastic composition, comprising:
A) aromatic polycarbonate and
B) Ba) reinforcing fibers
and/or
Bb) spherical particles of oxides of metals or metalloids of the 3rd main group, 4th main group and/or 4th transition group,
wherein
the composition further comprises:
C) PMMI copolymer and
D) phosphite stabilizer and/or phosphine stabilizer,
wherein, furthermore, the proportion of B) is ≥35% by weight to ≤60% by weight and the proportion of C) is >0.1% by weight in each case based on the total weight of the composition.

2. The composition as claimed in claim 1, wherein the aromatic polycarbonate A) is the homopolycarbonate based on bisphenol A, the homopolycarbonate based on 1,1-bis(4-hydroxyphenyl)-3,3,5-trimethylcyclohexane, a copolycarbonate based on the monomers bisphenol A and 1,1-bis(4-hydroxyphenyl)-3,3,5-trimethylcyclohexane or a mixture of at least two of the abovementioned polymers.

3. The composition as claimed in claim 1, wherein component B) is Bb) spherical quartz having an average diameter $d_{50}$ of ≥3 μm to ≤5 μm and an average diameter $d_{98}$, in each case determined according to ISO 13320:2009, of ≥10 μm to ≤15 μm and/or Ba) glass fibers having a cut length of ≥2 mm to ≤5 mm and a cross sectional ratio of ≥1:1 to ≤2:1.

4. The composition as claimed in claim 1, wherein the proportion of C) is ≤0.5% by weight based on the total weight of the composition.

5. The composition as claimed in claim 1, wherein the glass transition temperature of the PMMI copolymer C) determined according to DIN EN ISO 11357-2:2014-07 at a heating rate of 20° C./min is ≥120° C. to ≤170° C.

6. The composition as claimed in claim 1, wherein D) is tris(2,4-di-tert-butylphenyl)phosphite, bis(2,4-dicumylphenyl)pentaerythritol diphosphite, bis(2,6-di-tert-butyl-4-methylphenyl)pentaerythritol diphosphite, triphenylphosphine or a mixture containing at least one of the abovementioned compounds.

7. The composition as claimed in claim 1, wherein the proportion of D) is ≥0.01% by weight to ≤0.5% by weight based on the total weight of the composition.

8. The composition as claimed in claim 1, wherein the composition contains the spherical particles Bb) and has a coefficient of linear thermal expansion (CLTE) determined according to DIN 53752:19080-12 and measured in a temperature range of 23-60° C. of ≥20 ppm/K to ≤50 ppm/K.

9. The composition as claimed in claim 1, comprising, based on the total weight of the composition:
≥55% by weight to ≤65% by weight of A),
≥35% by weight to ≤45% by weight of B),
≥0.2% by weight to ≤0.5% by weight of C) and
≥0.01% by weight to ≤0.1% by weight of D),
wherein the parts by % by weight sum to ≤100% by weight.

10. A layered arrangement comprising a substrate layer and a reflection layer distinct from the substrate layer and at least partially covering the substrate layer, wherein the reflection layer at least partially reflects light in the wavelength range from 380 nm to 750 nm, wherein the substrate layer contains a composition as claimed in claim 1.

11. The layered arrangement as claimed in claim 10, wherein the reflection layer is a metal layer.

12. The layered arrangement as claimed in claim 10, wherein the reflection layer has a thickness of ≥10 nm to ≤100 nm.

13. The layered arrangement as claimed in claim 10, wherein the layered arrangement is not planar.

14. An illumination apparatus comprising a light source and a reflector, wherein the reflector is arranged such that at least a portion of the light emitted by the light source is reflected by the reflector,
wherein the reflector contains a layered arrangement as claimed in claim 10.

15. A process for producing a molded article, wherein a thermoplastic composition is molded to afford the molded article under the influence of heat,
wherein the thermoplastic composition is a composition as claimed in claim 1.

* * * * *